(12) United States Patent
Schnell (10) Patent No.: US 7,909,147 B1
(45) Date of Patent: Mar. 22, 2011

(54) LOW DRAG FAILSAFE BRAKE

(75) Inventor: Ray F. Schnell, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 1072 days.

(21) Appl. No.: 11/705,693

(22) Filed: Feb. 14, 2007

(51) Int. Cl.
*F16D 65/833* (2006.01)
(52) U.S. Cl. ............. 188/264 D; 188/71.5; 188/264 CC
(58) Field of Classification Search .............. 188/264 R, 188/264 D, 264 E, 264 CC, 71.5
See application file for complete search history.

(56) References Cited

U.S. PATENT DOCUMENTS

| | | | |
|---|---|---|---|
| 4,134,483 A * | 1/1979 | Horsch | 192/113.35 |
| 4,624,353 A | 11/1986 | Sailer et al. | |
| 5,190,123 A * | 3/1993 | Hvolka | 188/71.6 |
| 5,322,147 A | 6/1994 | Clemens | |
| 5,355,978 A | 10/1994 | Price et al. | |
| 5,469,943 A | 11/1995 | Hill et al. | |
| 6,098,771 A * | 8/2000 | Vu | 192/70.12 |
| 6,244,407 B1 * | 6/2001 | Kremer et al. | 192/70.12 |
| 6,371,255 B1 | 4/2002 | LeBegue | |
| 2002/0108826 A1 * | 8/2002 | Miller et al. | 188/280 |

\* cited by examiner

*Primary Examiner* — Bradley T King
(74) *Attorney, Agent, or Firm* — Renner, Kenner, Greive, Bobak, Taylor & Weber (57) ABSTRACT

A brake adapted to be rotationally coupled with a shaft and in communication with a fluid source and a negative pressure source, the brake including a housing defining a chamber therein. A disc assembly is positioned within the chamber and includes a plurality of stationary discs carried by the housing and a plurality of rotating discs carried by the shaft. The rotatable discs and stationary discs are positioned for engagement. A piston is movable to cause the stationary discs to engage the rotatable discs. A first fluid input is in communication with the fluid source, providing a constant supply of fluid to the chamber. A second fluid input is in communication with the fluid source, providing fluid when the stationary and rotating discs are caused to engage.

16 Claims, 11 Drawing Sheets

LOW DRAG FAILSAFE BRAKE

TECHNICAL FIELD

This invention relates to a brake provided with coolant. More specifically, this invention relates to such a brake wherein the coolant is provided upon actuation of the brake.

BACKGROUND ART

Many forms of heavy industrial equipment require disc braking systems which, during operation, generate a significant amount of heat. Further, such systems often require a steady supply of lubrication to ensure efficient operation and long life. One method for dispersing the generated heat and providing lubrication is by supplying fluid directly to the disc assembly within the brake housing. The fluid used in such brakes provides both the cooling and lubricating functions and is often an oil based product. Such brakes are often referred to as "wet" brakes because of the constant supply of fluid to the interior chamber of the brake.

While the continuous provision of fluids to the brake chamber is effective in cooling and lubricating the brake, other problems could exist in such a design. Specifically, fluid accumulates and pools within the brake and the rotating discs experience significant drag as they rotate therethrough. This drag creates a measurable torque and effects drive-train efficiency.

In view of these problems, it is evident that the need exists for a brake which provides sufficient cooling and lubrication but reduces the drag upon the disc assembly.

DISCLOSURE OF THE INVENTION

It is thus an object of the present invention to provide a brake for machinery or the like, which provides coolant to the disc assembly.

It is a further object of the present invention to provide a brake, as above, which provides additional coolant upon actuation of the brake.

These and other objects of the present invention, as well as the advantages thereof over existing prior art forms, which will become apparent from the description to follow, are accomplished by the improvements hereinafter described and claimed.

In general a brake in accordance with the present invention includes a housing defining a chamber, a disc assembly positioned within the chamber including a plurality of stationary discs carried by the housing and a plurality of rotating discs carried by the shaft, the rotatable discs and the stationary discs being positioned for engagement with each other. A piston is movable to cause the stationary discs to engage the rotatable discs. A first fluid input may be in communication with the fluid source and provide a constant supply of fluid to the chamber. A second fluid input may be in communication with the fluid source and provide fluid when the stationary and the rotating discs are caused to engage.

In accordance with another aspect of the present invention, a brake includes a housing having a chamber therein. A disc assembly is positioned within the chamber and includes a plurality of stationary discs carried by the housing and a plurality of rotating discs carried by the shaft, the rotatable discs and the stationary discs being axially movable and positioned for engagement with each other. A first orifice is adapted to communicate a constant supply of fluid to the chamber and a second orifice is adapted to variably provide fluid to the chamber. A braking force is applied to the shaft when a compressive force is applied to the disc assembly. The second orifice is unobstructed when the compressive force is applied and obstructed when no compressive force is applied.

In accordance with yet another aspect of the present invention, a brake includes a housing having a chamber therein, a disc assembly is positioned within the chamber and includes a plurality of stationary discs carried by the housing and a plurality of rotatable discs carried by the shaft. The rotatable discs and the stationary discs being axially movable and positioned for engagement. A fluid input is operatively interconnected with the disc assembly. Wherein a braking torque is provided to the shaft when the disc assembly is axially moved and compressed against the housing, the fluid input providing fluid upon the axial movement.

A preferred exemplary low drag failsafe brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
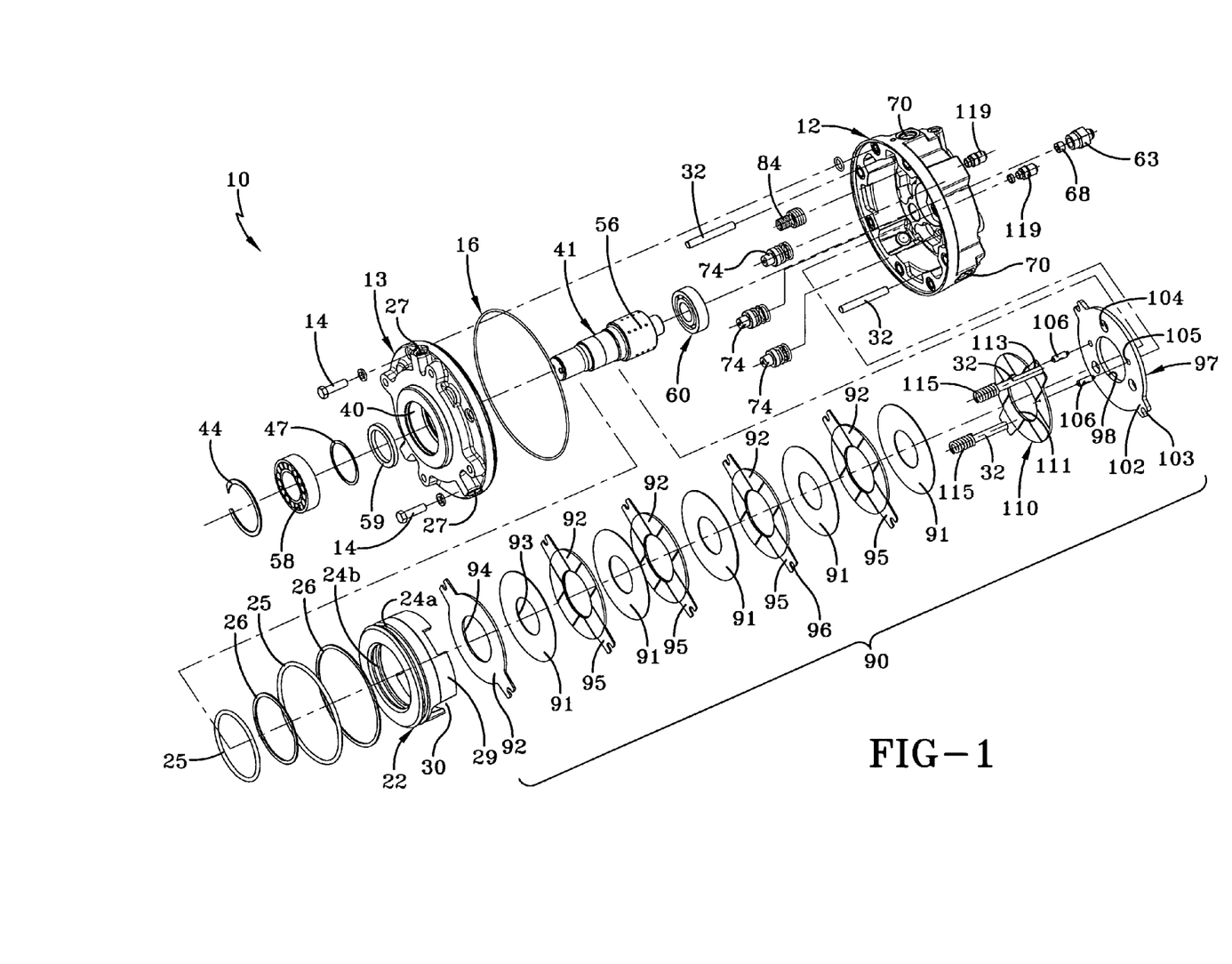
FIG. 1 is an exploded view of a brake assembly made in accordance with the present invention.
Figure 2:
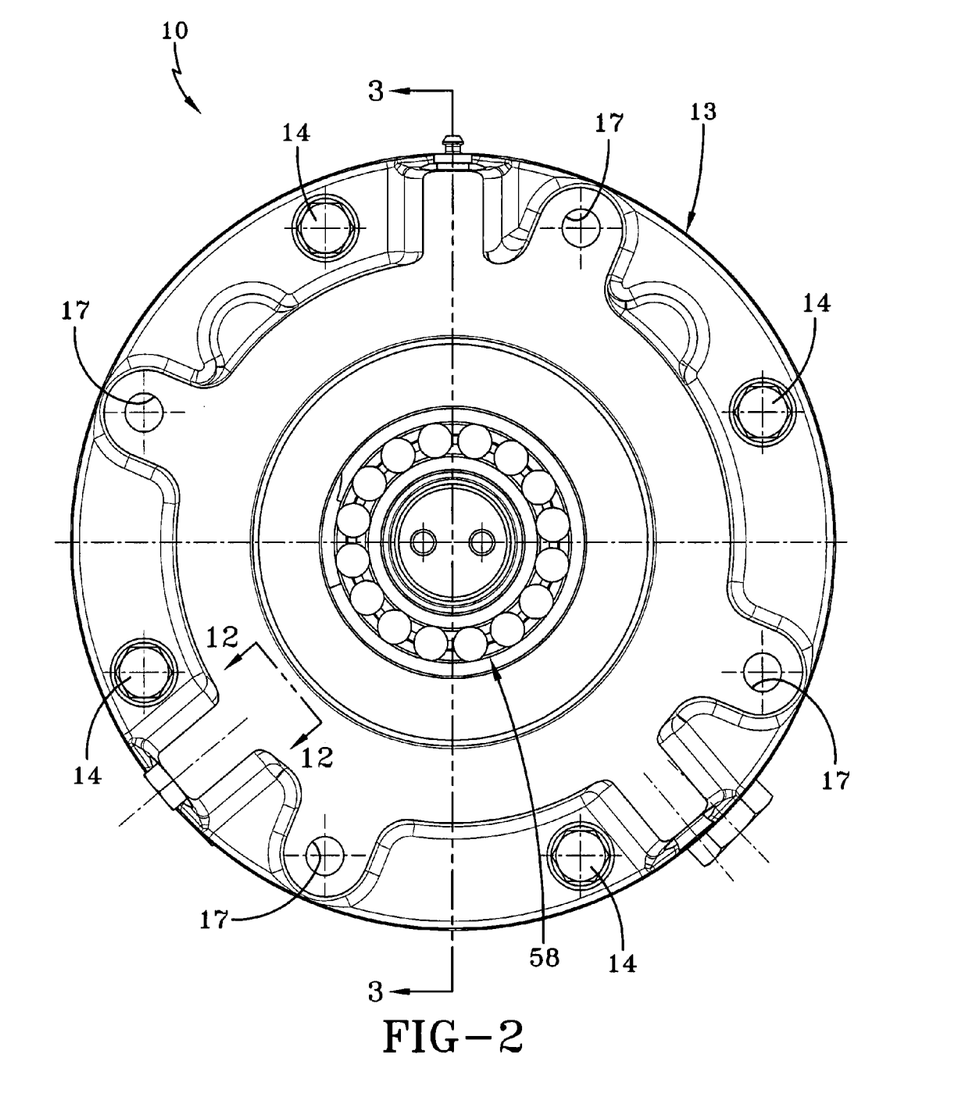
FIG. 2 is a front elevational view of the brake assembly of FIG. 1.
Figure 3:
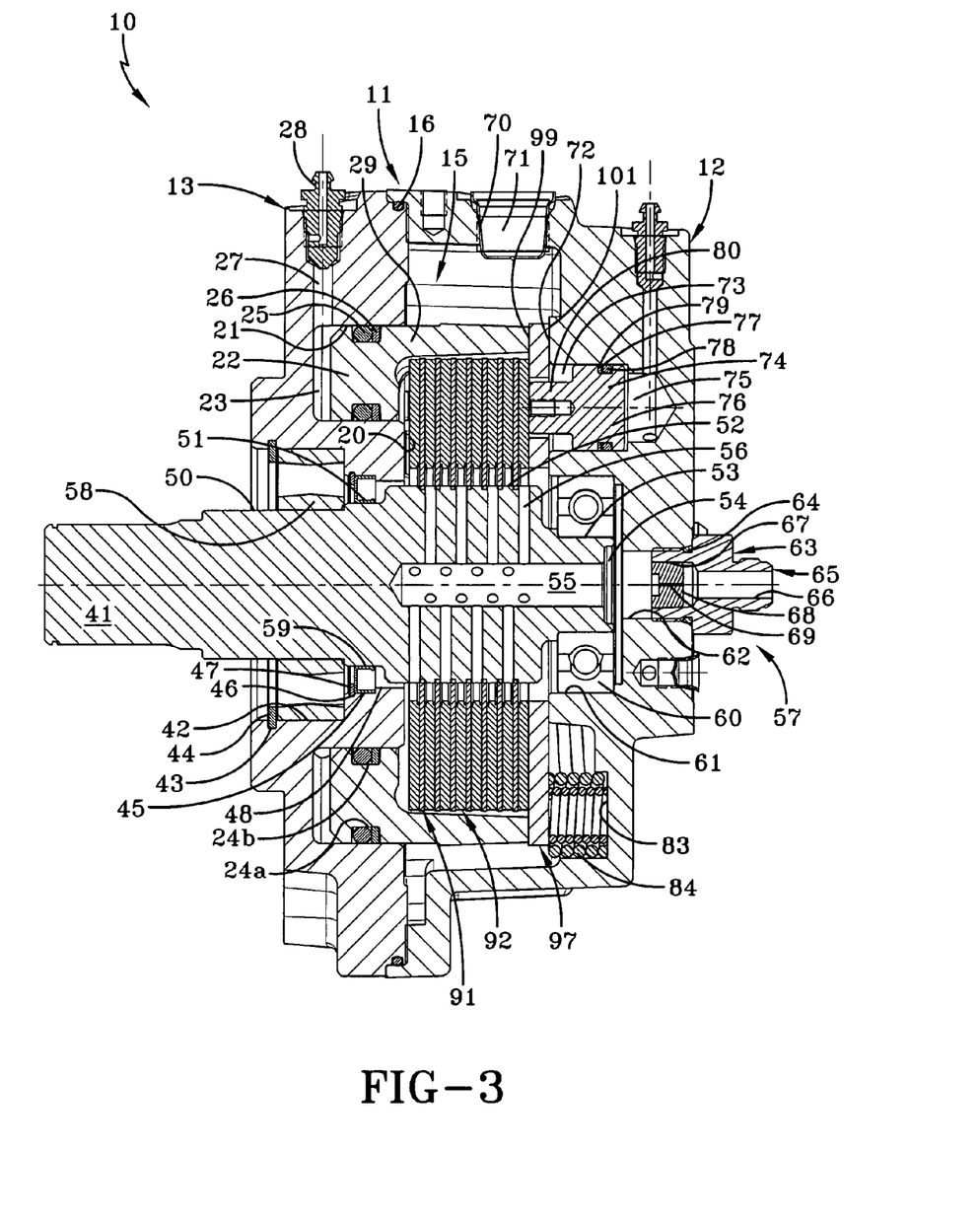
FIG. 3 is a sectional view taken substantially along line 3-3 of FIG. 2.

A brake made in accordance with the present invention is indicated generally by the numeral 10 and includes a housing assembly 11 which contains and protects the working components of brake 10, in addition to providing the means to mount the brake 10 to a piece of equipment, machinery or the like. Referring to FIGS. 1-3, housing assembly 11 includes a main housing 12 and a power plate 13. Main housing 12 is generally cylindrical and cup-shaped in configuration, having an open end. Power plate 13 is coupled to main housing 12 at the open end by a plurality of bolts 14. Thus configured, main housing 12 and power plate 13 define a sealed chamber 15 which retains the working brake components as will be hereinafter discussed. A gasket 16 may be provided between a portion of the mating surface of main housing 12 and power plate 13, thereby preventing contamination of the lubricants within chamber 15. Gasket 16 also prevents escape of the lubricants within chamber 15. Main housing 12 and power plate 13 further include a plurality of mounting bores 17 (see FIG. 2) which are aligned and extend through housing assembly 11. Mounting bores 17 provide a means to attach brake 10 to a machine or other device in need of brakes. For example, bolts may be inserted through bores 17 and engage threaded holes in a machine frame (not shown), thereby securing housing assembly 11 thereto.

Figure 4:
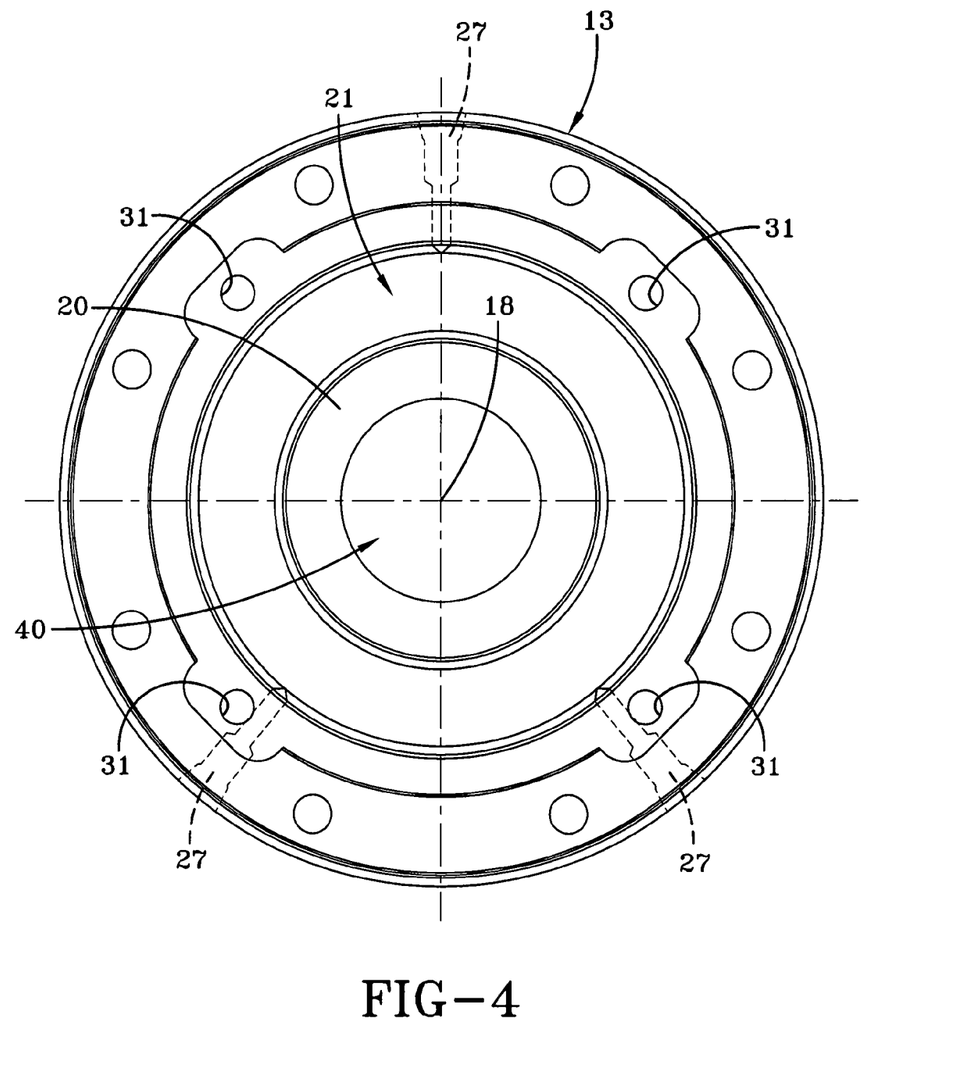
FIG. 4 is an elevational view of the interior face of the power plate of the brake.

Referring to FIGS. 3 and 4, power plate 13 is generally disc shaped and includes an interior surface 20 which faces chamber 15. An annular channel 21 is provided which may be centered about a central axis 18 and which extends inwardly from interior surface 20. Annular channel 21 is configured as a circumferential groove having a generally square cross-section and is adapted to receive an annular piston 22 therein. Annular channel 21 thereby serves as a piston housing, and to that end, when annular piston 22 is so inserted, a sealed reservoir 23 is created. Annular piston 22 includes a pair of circumferential grooves 24a and 24b along the inner and outer radial surface thereof. Grooves 24 each receive an o-ring 25 which sealingly contacts piston 22 and channel 21. Grooves 24 may each also receive a backup ring 26 proximate to o-ring 25 on the cavity side of grooves 24. Backup rings 26 sealingly contact piston 22 and channel 21, ensuring that pressurized fluid within reservoir 23 is not transmitted to cavity 15. One or more ports 27 may be provided to communicate pressurized fluid from an external pressure source to the reservoir 23, thus selectively actuating the piston 22. One or more of the ports 27 may be provided with a screw bleeder valve 28 which may selectively be employed to empty the reservoir 23 of pressurized fluids. Still further, one or more of the ports 27 may be in communication with a pressure exhaust line which may return the pressurized fluid to a source when piston 22 is un-actuated. The present embodiment discloses three ports 27 positioned 120 degrees apart. Each port 27 may selectively receive a bleeder valve, plug or connector for a fluid pressure line depending upon end-user requirements and the orientation of the brake within the machinery. Providing multiple ports in various locations creates flexibility for end-users and aids in installation.

Piston 22 is further provided with four curved fingers 29, separated by slots 30, which project from the radially outer periphery of piston 22 and extend axially into cavity 15, toward main housing 12. It should be appreciated that, while the present embodiment discloses four curved fingers, more or less may be employed.

As shown in FIG. 4, power plate 13 includes four axially oriented torque pin holes 31 which are positioned equidistant from axis 18 and spaced 90 degrees apart. Torque pin holes 31 are each adapted to receive a torque pin 32 (see FIG. 1) and are axially aligned with a pair of matching torque pin holes 33 (see FIG. 5) on main housing 12. When main housing 12 and power plate 13 are assembled, torque pins 32 span chamber 15 and are securely positioned within torque pin holes 31 and 33.

Power plate 13 further includes a central bore 40 which is concentric with axis 18. Bore 40 allows a shaft 41 to project therethrough and includes three distinct surfaces. A bearing surface 42 is located adjacent to the end of bore 40 proximate to the exterior of power plate 13. Bearing surface 42 may be provided with a circumferential groove 43 which is adapted to receive a retaining ring 44. A seal surface 45 is positioned adjacent to, and has a smaller diameter than bearing surface 42. Seal surface 45 may also be provided with a circumferential groove 46 which is adapted to receive a retaining ring 47. A stop surface 48 is positioned adjacent to seal surface 45. Stop surface 48 has a smaller diameter than seal surface 45 and terminates at interior surface 20, proximate to chamber 15.

Shaft 41 is generally cylindrical and includes several distinct outer surfaces. A first bearing surface 50 is located adjacent to bearing surface 42 of bore 40. A seal surface 51 is provided adjacent to, and has a larger diameter than, bearing surface 50. A disc surface 52 is provided adjacent to, and has a larger diameter than, seal surface 51. Disc surface 52 is positioned within chamber 15 and includes a plurality of radially projecting splines (not shown) along the axial length thereof. A second bearing surface 53 is provided proximate to an interior end 54 of shaft 41. Second bearing surface 53 has a diameter that is smaller than the diameter of disc surface 52.

Shaft 41 further includes a central hole 55 which extends axially inward from the interior end 54 of shaft 41. Central hole 55 is in fluid communication with a plurality of shaft oil ports 56, which extend radially from central hole 55 and terminate at disc surface 52. As will be hereinafter described in more detail, central hole 55 and shaft oil ports 56 communicate a fluid into chamber 15. It should be appreciated that the fluid may be a coolant and/or a lubricant. Typically, the fluid is oil based which provides desired lubrication, corrosion prevention and heat transfer functions.

Shaft 41 is rotatable within chamber 15. To provide for reduced rotational friction, a first bearing 58 is provided between shaft first bearing surface 50 and power plate bearing surface 42. Bearing 58 is restrained from axial movement by retaining ring 43 and by the steps created by seal surfaces 45 and 51. A lip seal 59 is provided between seal surfaces 45 and 51 to prevent contaminates from entering chamber 15, while maintaining fluids within chamber 15. Lip seal 59 is restrained from axial movement by retaining ring 47 and by the step created by stop surface 48. A second bearing 60 is provided between shaft second bearing surface 53 and a circumferential bearing surface 61 provided in main housing 12. In this manner shaft 41 is rotatable within housing 11. In the present embodiment, bearing 58 is positioned outside chamber 15 and second bearing 60 is positioned inside chamber 15. Thus, fluids provided within chamber 15 contact second bearing 60 but not first bearing 58. It should be appreciated, however, that in other embodiments, first bearing 58 may reside within chamber 15.

Figure 5:
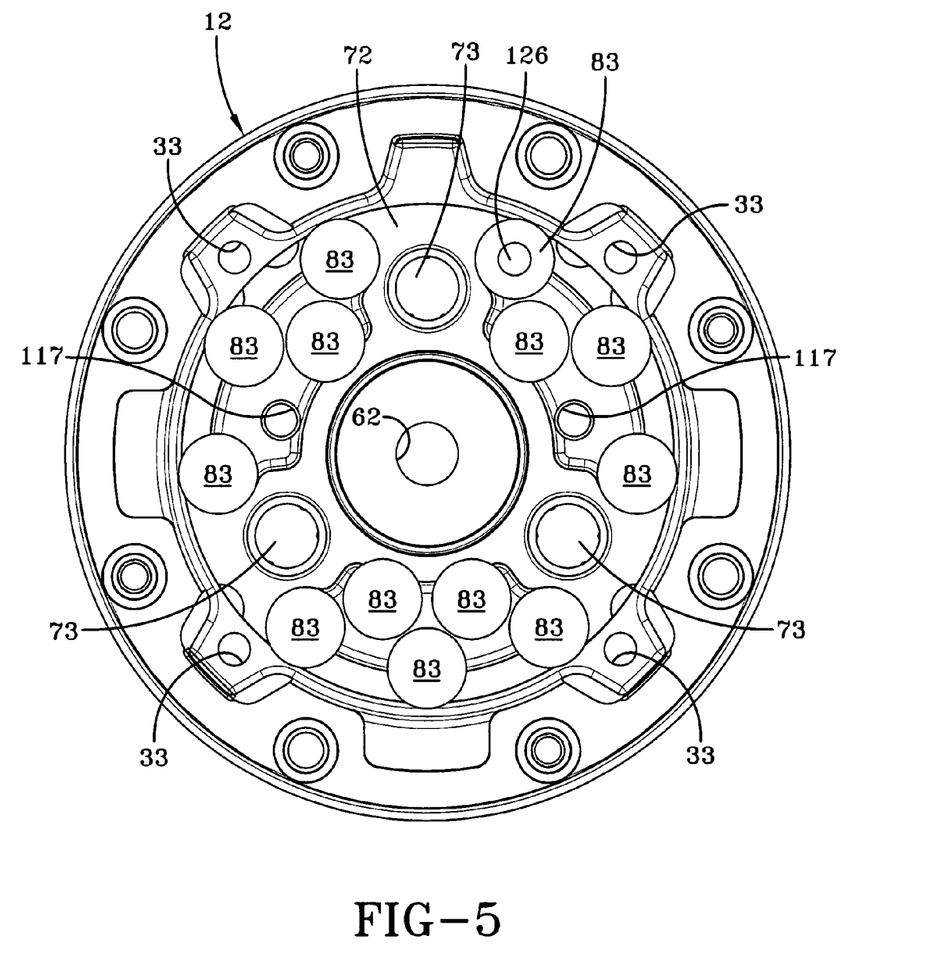
FIG. 5 is an elevational view of the interior face of the main housing of the brake.

Referring now to FIGS. 3 and 5, a first fluid input generally indicated by the numeral 57 may be provided which supplies a constant flow of fluid into chamber 15. First fluid input 57 includes a first orifice 62, which may be located on main housing 12, aligned with central axis 18. First orifice 62 extends from the exterior of main housing 12 to chamber 15 and is configured to receive an orifice adapter 63 therein. Orifice adapter 63 may include a threaded outer surface which engages matching threads within first orifice 62. A gasket 64 may be provided between the mating surface of orifice adapter 63 and first orifice 62, which promotes a proper seal therebetween. Orifice adapter 63 provides a connection site for an external fluid source to couple to brake 10 and provide fluid to chamber 15. Orifice adapter 63 includes a stepped central bore 65 which includes a first portion 66 proximate to the exterior of brake 10 and a second portion 67 proximate to first portion 66 and terminating at the interior of brake 10. Second portion 67 has a diameter which is larger than first portion 66 and is adapted to receive a plug 68 therein. Plug 68 includes a bore 69 which permits fluid flow therethrough. Plug 68 is selectively removable and may be replaced with plugs having larger or smaller diameter bores, depending upon a desired fluid flow rate. Thus it should be evident that an external fluid source may be coupled to orifice adapter 63 and that fluid may be provided through first portion 66, bore 69, and finally first orifice 62. Thereafter fluid may travel to second bearing 60 to provide cooling and lubricating functions. Further, fluid may flow into central hole 55 of shaft 41 and consequently through oil ports 56 and into chamber 15.

Main housing 13 includes one or more drain ports 70. The present embodiment provides three ports 70 located at the radially outer wall of main housing 12 and equidistant from one another. It should be appreciated that more or less drain ports 70 may be employed. Typically, one or more coolant drain ports are sealed by a plug 71. The plurality of drain ports 70 are provided to enable easy and flexible installation steps. One or more drain ports 70 are interconnected to a negative pressure source (not shown) which, as will be hereinafter described in more detail, continuously draws fluid out of chamber 15. In other words, negative pressure source draws a negative pressure on chamber 15, causing fluid to exit via a drain port 70.

Main housing 13 includes a stop surface 72 which may be generally annular and faces chamber 15. A plurality of piston bores 73 are provided on stop surface 72, which extend axially inwardly and are each adapted to receive a piston 74 therein. Each piston bore 73 thereby serves as a piston housing, and to that end, when piston 74 is so inserted, a sealed reservoir 75 is created. Piston 74 includes a body 76 which is cylindrical and adapted to fit within a piston bore 73. A circumferential groove 77 is provided around body 76 which may receive an o-ring 78 which sealingly contacts piston 74 and bore 73. Groove 77 may also receive a backup ring 79 proximate to o-ring 78 on the chamber side of grooves 77. Backup rings 79 sealingly contacts piston 74 and bore 73, ensuring that pressurized fluid within reservoir 75 is not transmitted to chamber 15. Piston 74 further includes an extension 80 which is generally cylindrical and has a smaller diameter than body 76. Extension 80 extends out of bore 73 into chamber 15 where it interacts with a disc assembly 90 which will be hereinafter described in more detail. The present embodiment includes three piston bores 73 with corresponding pistons 74, though it should be appreciated that any number of pistons 74 may be employed. It is advantageous, however, to position the pistons in a manner which distributes the loads equally about axis 18. Thus, in the present embodiment, piston bores 73 are arranged in a triangular pattern, being equidistant from axis 18 and approximately 120 degrees apart. It should, however, be appreciated that other piston configurations may be used. For example, the plurality of pocket pistons may be replaced with a single annular piston, similar to piston 22. Still further, it should be appreciated that, though the present embodiments discloses piston 22 on an opposed side of chamber 15 from pistons 74, both pistons may be positioned on the same side of chamber 15.

Figure 6:
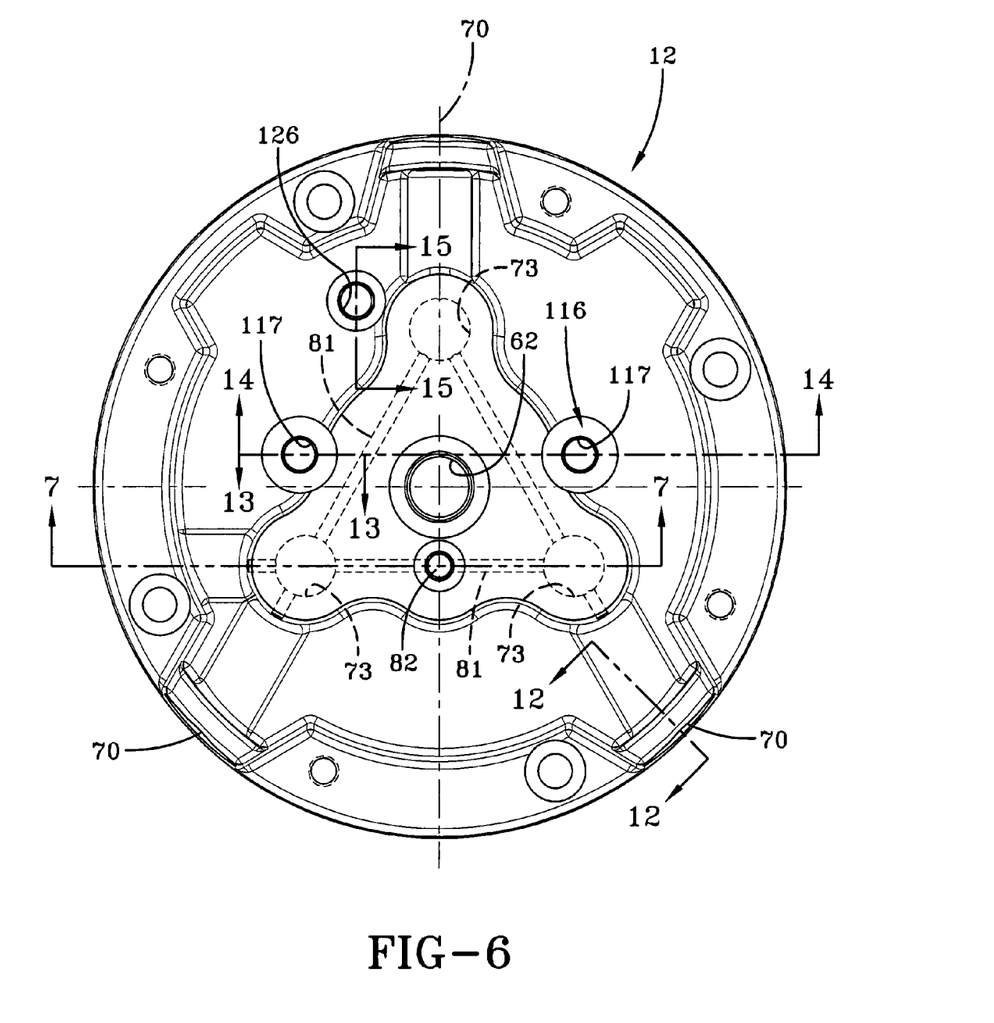
FIG. 6 is an elevational view of the rear face of the housing of the brake.
Figure 7:
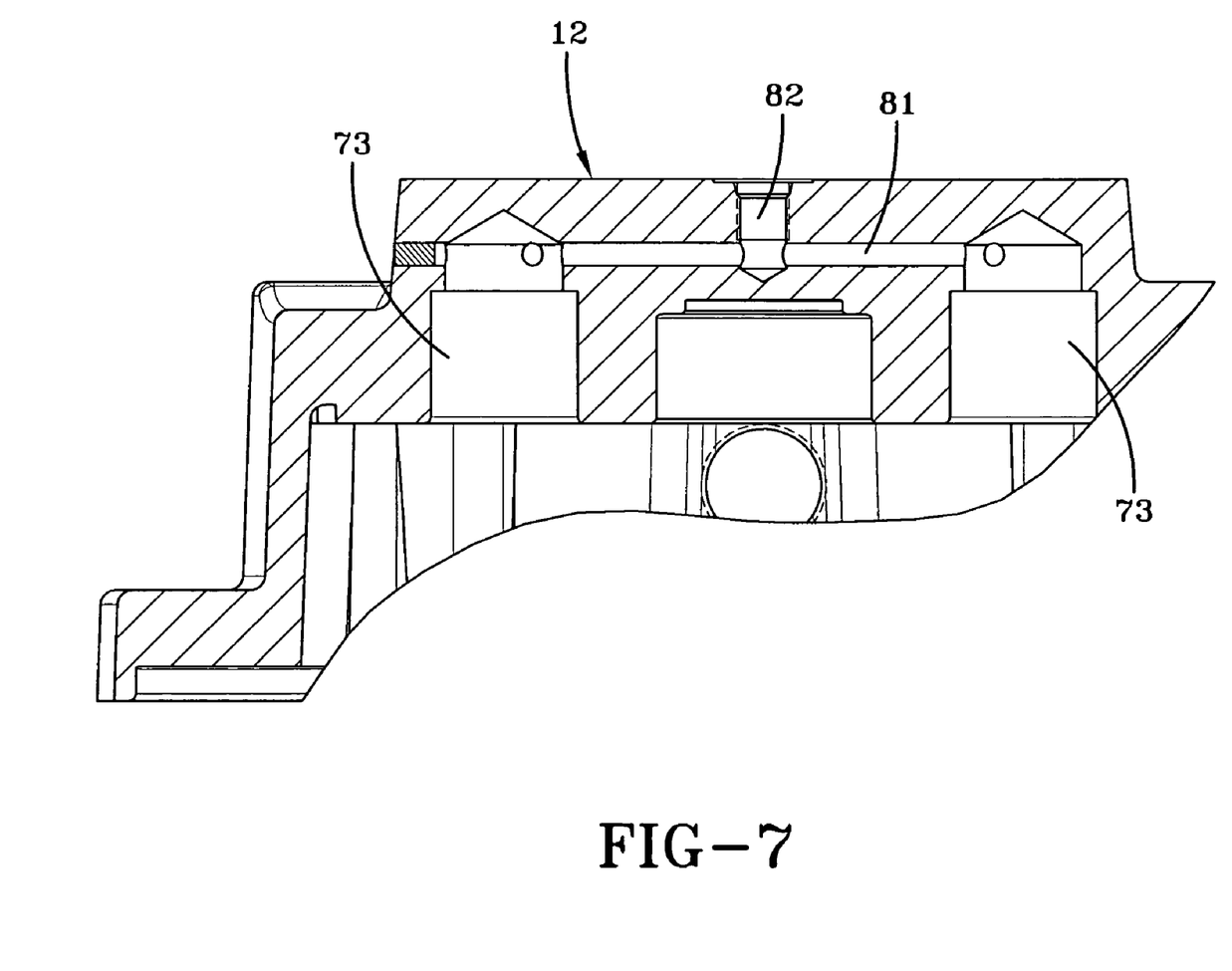
FIG. 7 is a partial sectional view taken substantially along line 7-7 of FIG. 6.

Referring now to FIGS. 3, 6 and 7, bores 73 are in fluid communication with each other through a plurality of interconnecting channels 81 within main housing 12. At least one inlet channel 82 is provided which may communicate with an outside pressure source to selectively pressurize reservoirs 75. Because the reservoirs 75 are interconnected, approximately the same pressure is realized within each reservoir 75 and consequently each piston 74 exerts approximately the same piston force when pressurized fluid is provided via inlet channel 82.

Main housing 12 further includes a plurality of spring recesses 83 which extend inwardly from stop surface 72. The present embodiment includes thirteen spring recesses, though, more or less may be included. Each spring recess 83 is adapted to receive one or more compression springs 84. As shown in FIG. 3, compression springs 84 interact with a disc assembly generally indicated by the numeral 90 in a manner which will be hereinafter described.

Disc assembly 90 includes a plurality of rotating discs 91 and a plurality of stationary discs 92. Rotating discs 91 and stationary discs 92 are stacked in an alternating manner within chamber 15 as shown in FIG. 3. In the present embodiment seven rotating and seven stationary discs are shown, but it should be appreciated that any number may be employed. Rotating discs 91 are provided with a radially inner surface 93 which is splined to engage the splines of disc surface 52 of shaft 41. In this manner, as shaft 41 rotates, rotating discs 91 rotate therewith. While rotating discs 91 are rotationally coupled to shaft 41, they are free to slide axially thereon. Stationary discs 92 have a radially inner surface 94 which fits over, but is not engaged by, the splined disc surface 52 of shaft 41. Thus, stationary discs 92 will not rotate with shaft 41.

Figure 8:
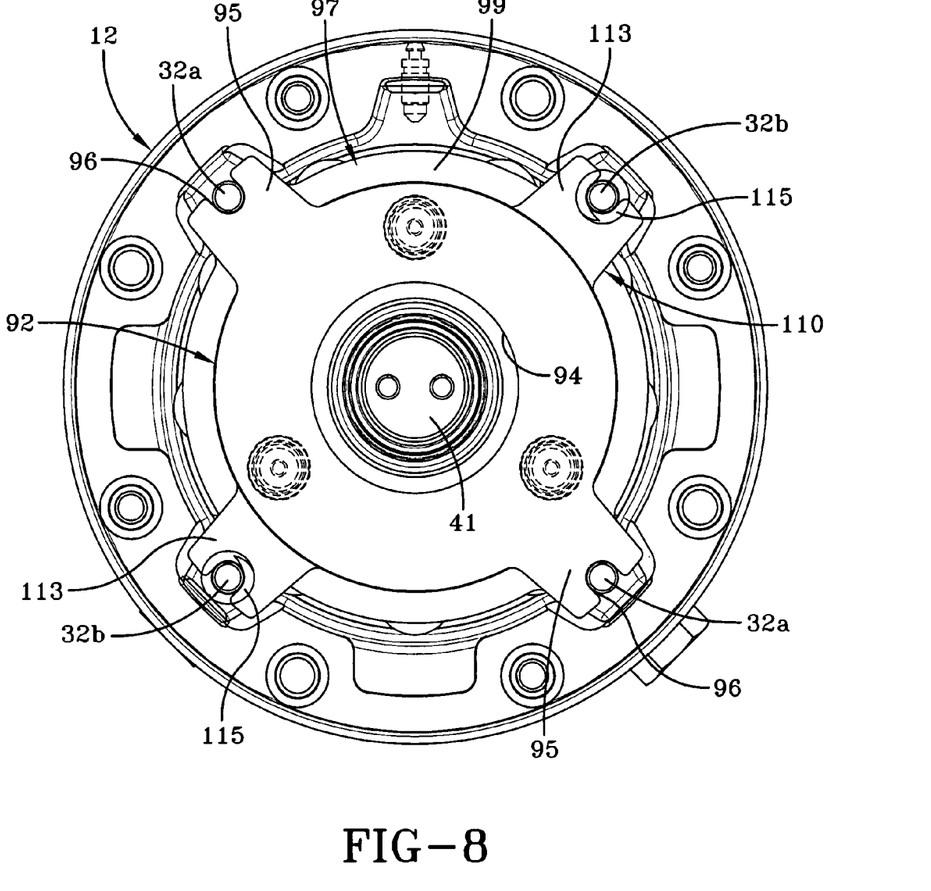
FIG. 8 is an elevational top view of the disc assembly and housing of the brake.

As best shown in FIGS. 1 and 8, stationary discs 92 are provided with diametrically opposed ears 95 extending radially outwardly therefrom. Ears 95 are adapted to extend radially through slots 30 of annular piston 22 and slidingly engage pins 32 which are positioned radially outward of fingers 29. To that end, each ear 95 is provided with a groove 96 which is adapted to slidingly receive pin 32 therein. In this manner, stationary discs 92 are coupled to housing assembly 11, and thus prevented from rotating. The stationary discs 92 are, however, free to slide axially along pins 32. Therefore, when an axial force is applied to one end of disc assembly 90, stationary discs 92 are caused to slide axially and compress against rotating discs 91, creating a frictional interface. As is known in the art, when these discs are caused to engage each other, a braking torque is applied to shaft 41 due to the friction created between rotating discs 91 and stationary discs 92 which are prevented from rotating by pins 32.

Figure 9:
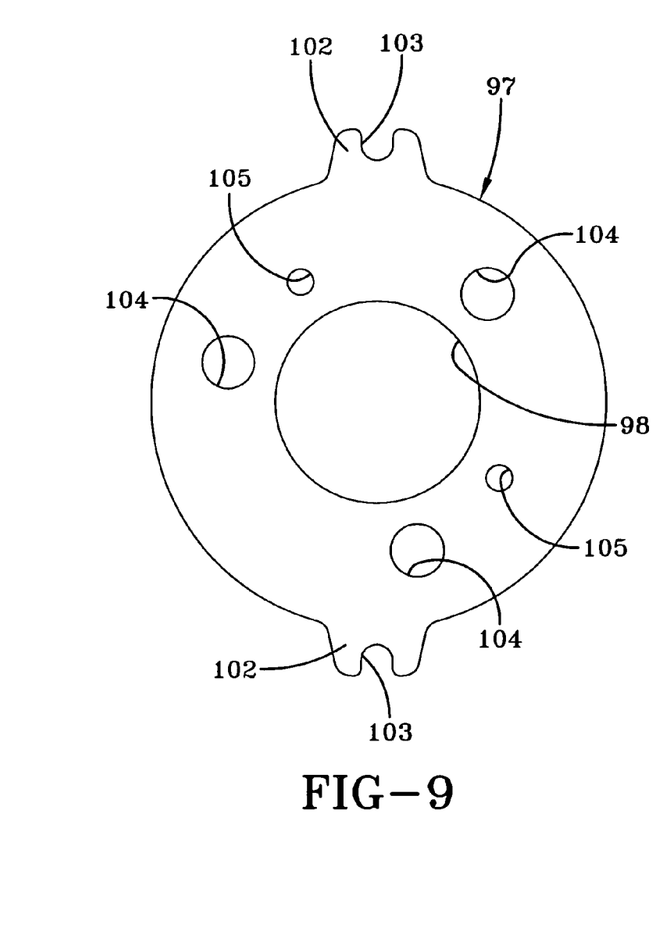
FIG. 9 is an elevational view of the primary disc of the disc assembly.

Referring to FIGS. 3 and 9, disc assembly 90 may further include a primary disc generally indicated by the numeral 97 which is positioned on the end of disc assembly 90 proximate to stop surface 72. Primary disc 97 is annular, with an inner surface 98 which fits over but does not engage shaft 41. As is evident from FIG. 3, the outside diameter of primary disc 97 is relatively larger than that of stationary discs 92. This allows fingers 29 of annular piston 22 to bypass rotating discs 91 and stationary discs 92 and contact a first surface 99 of primary disc 97, which faces chamber 15. A second surface 101 of primary disc 97 is opposed from first surface 99 and contacts springs 84. Primary disc 97 is provided with a pair of diametrically opposed ears 102 which extend radially outward therefrom. Ears 102 are adapted to slidingly engage pins 32. To that end, each ear is provided with a groove 103, each of which slidingly receives a pin 32 therein. In this manner, primary disc 97 is coupled to the housing, and thus prevented from rotating. The primary disc 97 is however, free to slide axially along pins 32. Primary disc 97 further includes a first set of bores 104, which are adapted to allow extension 80 of pistons 74 to project therethrough and contact a secondary disc 110. A second set of bores 105 are also provided on primary disc 97 which are each adapted to receive an orifice pin 106 therethrough. Thus, pistons 74 and pins 106 may interact with secondary disc 110 uninhibited by primary disc 97, which operates independently therefrom.

Figure 10:
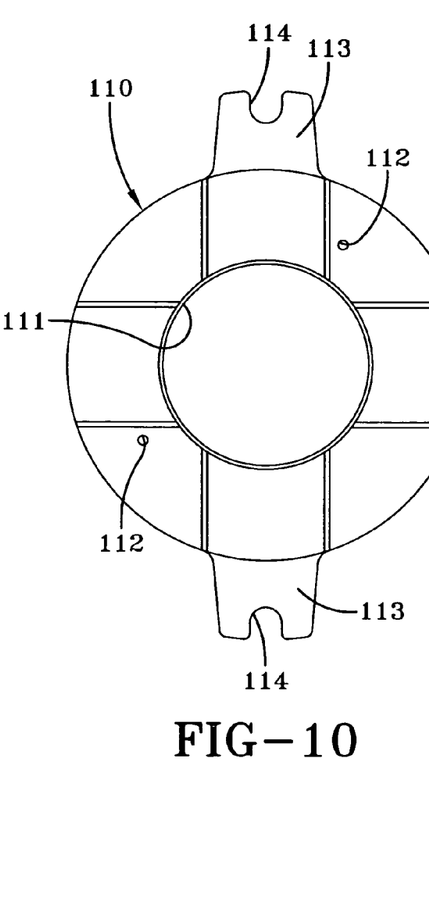
FIG. 10 is an elevational view of the secondary disc of the disc assembly.
Figure 11:
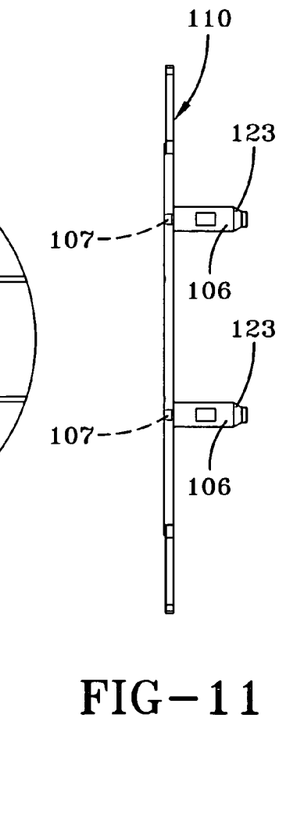
FIG. 11 is side elevational view of the secondary disc and pin.
Figure 12:
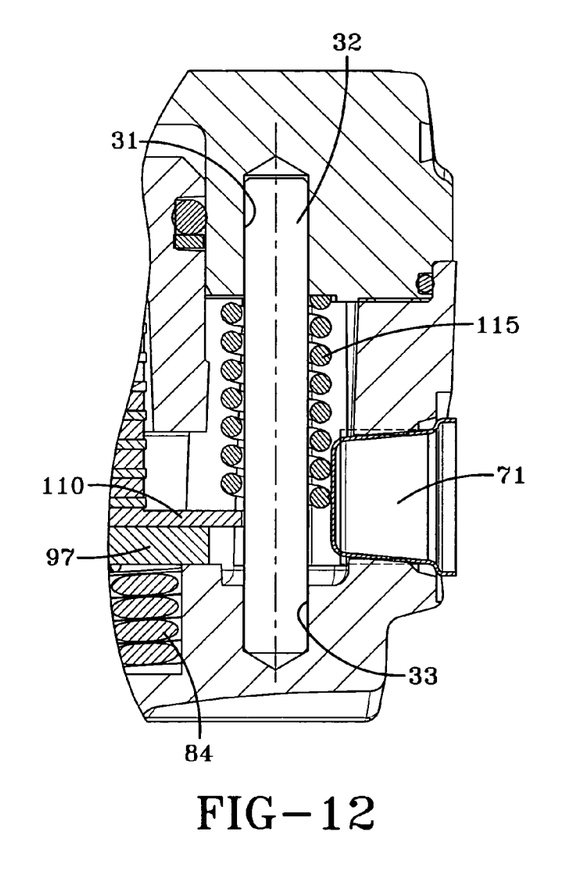
FIG. 12 is a partial sectional view taken substantially along line 12-12 of FIG. 2.
Figure 13:
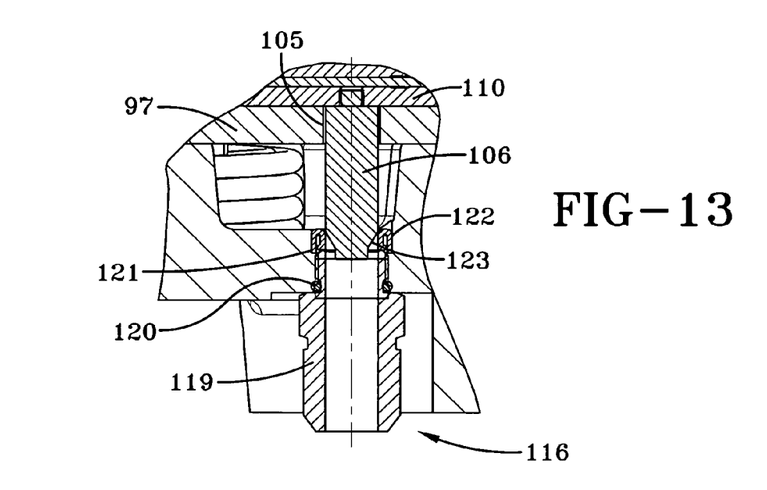
FIG. 13 is a partial sectional view of the second fluid input assembly taken substantially along line 13-13 of FIG. 6.
Figure 14:
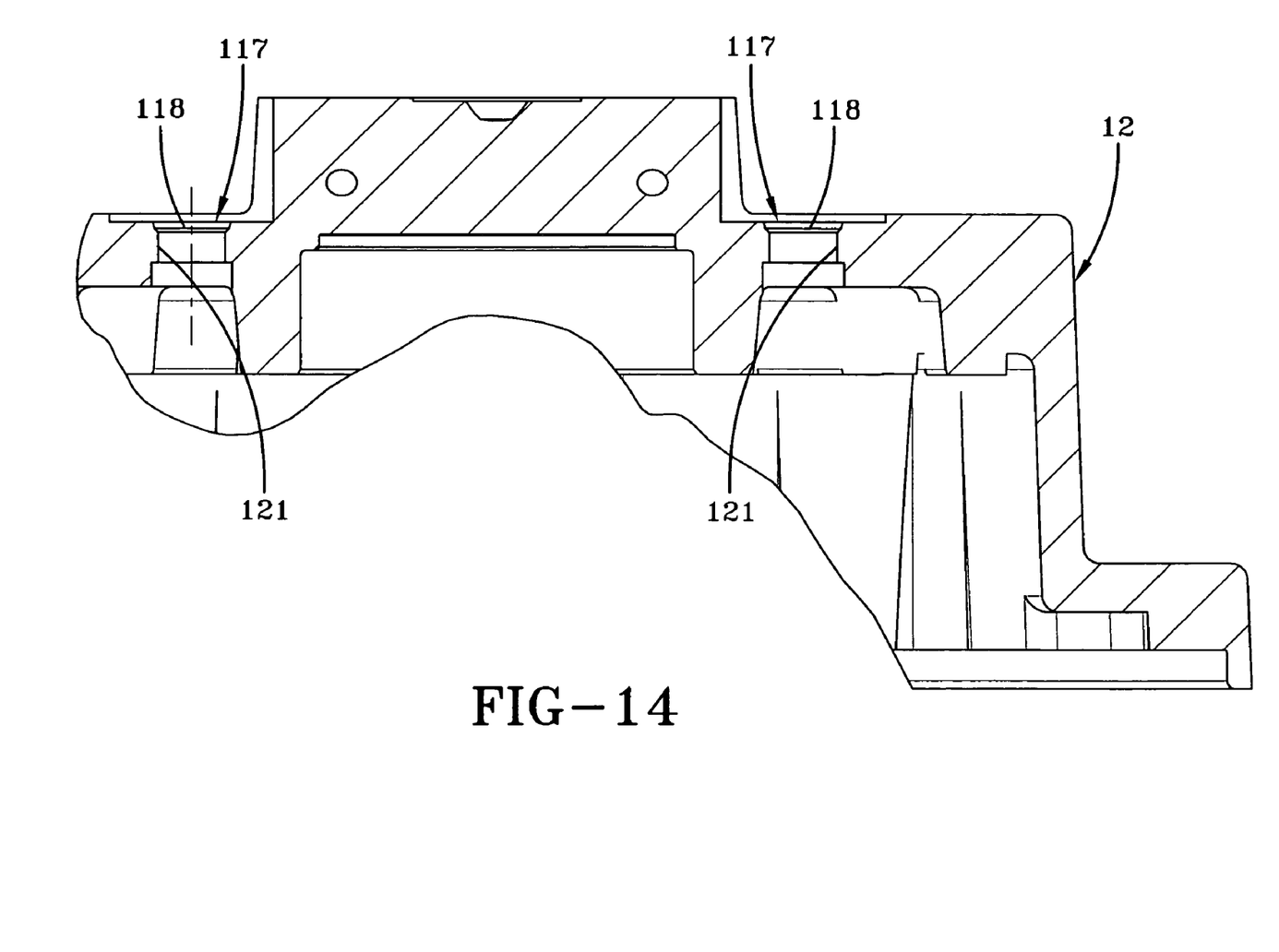
FIG. 14 is a partial sectional view of the second orifice taken substantially along line 14-14 of FIG. 6.

Secondary disc 110 is positioned between primary disc 97 and the stationary disc 92 closest to primary disc 97. As shown in FIGS. 10 and 11, secondary disc 110 is annular, with an inner surface 111 which fits over but does not engage shaft 41. A plurality of threaded holes 112 are provided and aligned with bores 105 of primary disc 97. Each hole 112 is adapted to receive matching threaded portions 107 of orifice pins 106. Thus, in this manner, pins 106 are secured to secondary disc 110 wherein axial movement of secondary disc 110 causes corresponding axial movement of pins 106. Secondary disc 110 is also provided with a pair of diametrically opposed ears 113 which extend radially outward therefrom. Ears 113 are adapted to slidingly engage pins 32. To that end, each ear is provided with a groove 114, each of which slidingly receives a pin 32 therein. In this manner, secondary disc 110 is coupled to the housing, and thus prevented from rotating. Secondary disc 110 is however, free to slide axially along pins 32. Further, as shown in FIG. 8, ears 113 are positioned on a different pair of pins 32 than stationary discs 92 and primary disc 97. In other words, the ears of stationary discs 92 and primary disc 97 are aligned and received on a first pair of pins 32a, and the ears of secondary disc 110 are offset 90 degrees, thereby residing separately on a second pair of pins 32b. As shown in FIGS. 8 and 12, return springs 115 may be received on second pair 32b between power plate 13 and secondary disc 110. Thus, secondary disc 110 is biased toward main housing 12 by return springs 115.

Referring now to FIGS. 5, 6, 13 and 14, a second fluid input 116 may be provided which variably supplies fluid to chamber 15. Second fluid input 116 provides fluid to chamber 15 when disc assembly 90 engages and a braking torque is applied to shaft 41. In other words, second fluid input 116 provides fluid to chamber 15 during movement of primary or secondary disc movement toward the disc stack. In this manner additional cooling and lubrication is provided during high heat generation periods, that is, braking. Second fluid input 116 includes a second orifice 117 which extends from the outer surface of main housing 12 and communicates with chamber 15. Second orifice 117 may include a threaded portion 118 which is adapted to receive the threaded portion of a fitting 119. Fitting 119 is adapted to provide easy coupling to an external fluid source (not shown). The external fluid source may be the same as that which provides fluid to first orifice 62 or may be a separate, independent source. In any event, the external fluid source provides fluid at a predetermined pressure to second orifice 117. An o-ring 120 may be provided at the area of intersection between main housing 12 and fitting 119 to promote a sealed fit therebetween. A circumferential step 121 may be located on bore 117 which receives a lip seal 122 therein. Pin 106 is adapted to selectively engage bore 117. To that end, an angled lip 123 may be provided which is adapted to engage bore 117, and particularly lip seal 122. As will become apparent, when secondary disc 110 moves axially away from main housing 12, pins 106 correspondingly move away. When pins 106 move away from main housing 12, angled lip 123 disengages from lip seal 122. In other words, when brake 10 is not engaged and rotating discs 91 spin freely, pin 106 obstructs orifice 117, preventing fluid flow therethrough. When brake 10 is engaged, pin 106 is drawn out of orifice 117 and fluid may flow from external fluid source into chamber 15. The present embodiment discloses a pair of second fluid inputs 116 but it should be appreciated that more or less may be employed. Though the above disclosed arrangement may be advantageous, other methods of varying the fluid supplied to the chamber may be employed. For example, in one embodiment, a valve may be externally controlled such that, during brake actuation, it opens to provide additional fluid to the chamber. In another embodiment, brake actuation energizes a fluid pump that supplies chamber 15 with fluid.

Figure 15:
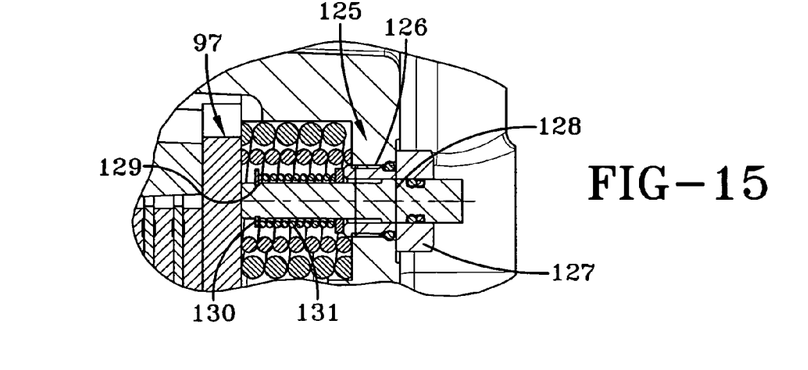
FIG. 15 is a partial sectional view of the indicator shaft taken substantially along line 15-15 of FIG. 6.

As shown in FIG. 15, main housing 12 includes a wear indicator 125 which indicates the relative position of primary disc 97, and consequently the level of disc wear, without the need to disassemble brake 10. Wear indicator 125 includes an indicator bore 126 which extends from the exterior of main housing 12 to chamber 15. A modified hex head plug 127 is secured within indicator bore 126 and includes a central hole which receives an indicator shaft 128. Indicator shaft 128 is an elongated pin which is long enough to contact primary disc 97. A circumferential groove 129 is located near the end of shaft 128 proximate to primary disc 97. A retaining ring 130 is received in groove 129. A spring 131 is positioned around shaft 128 and between ring 130 and main housing 12. Thus, indicator shaft 128 is biased toward contact with primary disc 97 and will move axially with disc as it moves. As a result, the portion of indicator shaft 128 which is visible outside main housing indicates to an operator the relative position of primary disc 97.

As assembled, brake 10 is engaged when no hydraulic fluid is supplied to it. In other words, when no hydraulic fluid is supplied to annular piston reservoir 23 or piston reservoirs 75, disc assembly 90 is compressed against interior surface 20 of power plate 13 causing a braking torque to be applied to shaft 41. In this orientation, springs 84 supply the actuating force to engage the brake by pushing primary disc 97 axially away from main housing 12 and toward power plate 13. Because disc assembly 90 is free to slide axially, springs 84 press against the second surface 101 of primary disc 97 causing it to move axially toward power plate 13. This in turn causes the rotating discs 91, stationary discs 92, and secondary disc 110 to slide axially towards power plate 13. When the disc assembly 90 contacts interior surface 20 of power plate 13, springs 84 compress the disc assembly 90 against power plate 13. In this condition, friction between the rotating discs 91 and the stationary and secondary discs 92 and 110 applies a torque to the stationary discs 92 and secondary disc 110 urging them to rotate. However, because ears 95 and 109 are confined by pins 32, stationary discs 92 and secondary disc 110 will not rotate and a braking torque is applied to the shaft. This type of brake actuation is commonly referred to as a failsafe mechanism, because the brake is engaged when no power is applied to the system. The brake 10 will prevent unwanted and often times dangerous shaft movement when the equipment is not operating.

When the machine is turned on, fluid under pressure, such as oil, may be supplied to the annular channel 21 either automatically or by operator control. As hydraulic fluid under pressure is received in reservoir 23, the fluid acts on piston 22 pushing it axially away from the power plate 13 toward main housing 12. Fingers 29 transfer the piston force to primary disc 97, countering the force of springs 84. If sufficient pressure is supplied within reservoir 23, the force of piston 22 will overcome the spring force, thereby moving primary disc 97 axially toward main housing 12 and against stop surface 72. This in turn eliminates the compressive force on disc assembly 90 and the disc assembly disengages, allowing the free rotation of rotatable discs 91. It should be appreciated that, even when disc assembly 90 is disengaged and no compressive force is applied thereto, some contact may occur between rotating and stationary discs 91 and 92. Such contact is inherent in such brake designs, and the resulting frictional forces are minimal compared to those generated when disc assembly is engaged by compression.

With the failsafe brake disengaged, the machinery may operate normally, allowing rotating discs 91 to spin freely within chamber 15. During normal operation, it may be desirous to provide service braking. Service braking occurs when an operator wishes to apply a braking torque to shaft 41 during normal operation, to selectively slow or stop rotation. Service braking provides more operator control and command than the failsafe brake. The service braking function is provided by service pistons 74. Extensions 80 of service pistons 74 extend through primary disc 97 and contact secondary disc 110. Ordinarily, springs 115 hold secondary disc 110 securely against primary disc 97, enabling rotating discs 91 to rotate freely. When fluid under pressure, such as oil, is supplied to reservoirs 75, the fluid acts on pistons 74, pushing them axially away from main housing 12 toward power plate 13. Extensions 80 transfer piston force to secondary disc 110 countering the force of return springs 115. If sufficient pressure is supplied within reservoirs 75, the force of pistons 74 will overcome the force of springs 115, thereby moving secondary disc 110 axially toward power plate 13. Consequently rotating and stationary discs 91 and 92 are pressed against interior surface 20. Pistons 74 thereafter cause stationary and secondary discs 91, 92 and 110 to engage by compressing them against power plate 13. In this condition, friction between the rotating discs 91 and the stationary and secondary discs 92 and 110 applies a torque to the stationary discs 92 and secondary disc 110 urging them to rotate. However, because ears 95 and 113 are confined by pins 32, stationary discs 92 and secondary disc 110 will not rotate and a braking torque is applied to the shaft. This type of brake actuation is commonly referred to as a service brake, because the failsafe is disengaged and the service brake is used during normal operation to slow or stop shaft 41.

This type of brake generally requires a fluid to be circulated therethrough which provides lubricating and cooling functions. Typically an oil based fluid is used, although other fluids may be employed. Lubrication is necessary, primarily to ensure that second bearing 60 functions with minimum friction. Also, lubrication is necessary to ensure that, when disengaged, the rotating and stationary discs 91 and 92 spin freely and any incidental contact friction therebetween is minimized by the presence of at least a small amount of coolant/lubrication. This ensures long bearing life and efficient machine operation. The cooling function is required because, when brake 10 is engaged, either via the failsafe method or the service method, heat is generated by the frictional contact between rotatable and stationary discs 91 and 92 respectively. Further, heat is generated by second bearing 60 during rotation. Thus, it should be evident that during normal non-engaged operation, a minimal amount of fluid is required, in particular to provide lubrication to second bearing 60. Yet when the disc assembly 90 is compressed, by either the failsafe function or service brake function, more fluid is necessary to remove excess heat buildup caused by the frictional contact between disc assembly 90. Thus, the present invention provides a first amount of fluid during normal, non-engaged operation, and additional fluid is provided automatically during braking as will be hereinafter described.

As described earlier, fluid is constantly provided through first orifice 62 via orifice adapter 63. Plug 68 is provided to selectively restrict the amount of fluid provided through first orifice 62. Typically a relatively small amount of fluid is provided through plug 68 which communicates with second bearing 60 and through ports 56 in shaft 41. Additionally, at least one drain port 70 is coupled to an negative pressure source which continuously draws fluid out of chamber 15. Thus, when operating under non-braking conditions, very little excess fluid remains within chamber 15 because drain port 70 draws out fluid as fast or faster than orifice adapter 63 provides it. As a result, little drag is realized by the rotating discs 91, as compared to prior art methods. Significantly, because no excess fluid resides within chamber 15 during normal operation, rotating discs 91 are not forced to spin through this excess fluid which would significantly increase drag and reduce efficiency.

Upon actuation of failsafe brake, as previously described, springs 84 push primary disc 97 axially away from main housing 12. Because the disc assembly 90 is free to slide axially, springs 84 press against the second surface 101 of primary disc 97 causing it to move axially toward power plate 13. This in turn causes the rotating discs 91, stationary discs 92, and secondary disc 110 to slide axially toward power plate 13. When the disc assembly 90 contacts interior surface 20, springs 84 compress the disc assembly 90 against power plate 13. Because pins 106 are coupled to secondary disc 110, pins 106 will also move axially towards power plate 13. This movement draws angled lip 123 away from lip seal 122, allowing additional fluid to flow from the external fluid source, through fitting 119 and into chamber 15.

Similarly, the actuation of service brake function will also cause additional fluid to flow into chamber 15. As previously described, the service braking function is provided by service pistons 74. Fluid under pressure is supplied to reservoirs 75 and pushes pistons 74 axially away from main housing 12 toward power plate 13. Extensions 80 transfer piston force to secondary disc 110 countering the force of return springs 115. When sufficient pressure is supplied to reservoirs 75, pistons 74 will overcome the force of springs 115 and move secondary disc 110 axially toward power plate 13, compressing rotating and stationary discs 91 and 92, respectively, against interior surface 20. Because pins 106 are coupled to secondary disc 110, pins 106 will also move axially toward power plate 13. This movement draws angled lip 123 away from lip seal 122, allowing additional fluid to flow from the external fluid source, through fitting 119 and into chamber 15.

Thus, the present invention provides a reduced amount of coolant to the brake during normal, non-braking operation. This reduced amount of coolant is drawn out via drain port 70 at the same, or faster rate than is introduced so that very little excess coolant remains inside cavity during non-braking operation. This results in improved efficiency, because rotating discs 91 spin primarily through air instead of a fluid, which would produce increased drag. When increased heat removal is necessary, during either failsafe or service braking, additional fluid is provided to remove the heat. Once braking is accomplished, the brake returns to normal non-braking operation, and the additional fluid is drawn out of chamber 15 by drain ports 70. Because drain ports 70 draw out fluid faster than is provided by first fluid input 57, excess fluid is eventually removed providing for reduced drag operation. Further, the variation of coolant disclosed in the present invention is not limited to failsafe braking applications, but may be used in any brake configuration that would benefit from low drag during non-braking operation and increased coolant during brake actuation.

In view of the foregoing, it should thus be evident that a brake as described herein accomplishes the objects of the present invention and otherwise substantially improves the art.

What is claimed is:

1. A brake adapted to be rotationally coupled with a shaft and in communication with a fluid source and a negative pressure source, the brake comprising:
   a housing defining a chamber;
   a disc assembly positioned within said chamber including
      a plurality of stationary discs carried by said housing and a plurality of rotating discs carried by the shaft, said rotatable discs and said stationary discs being positioned for engagement with each other;

a piston movable to cause said stationary discs to engage said rotatable discs;

a first fluid input in communication with the fluid source and providing a constant supply of fluid to said chamber;

a second fluid input in communication with the fluid source and providing fluid when said stationary and said rotating discs are caused to engage; and at least one pin, said second fluid input including an orifice in said housing, said pin being operatively connected to at least one disc in said disc assembly and obstructing said orifice when said rotatable and said stationary discs are not engaged;

wherein said disc assembly further includes a primary disc and a secondary disc, said secondary disc abutting said primary disc at the end of said disc assembly, said primary disc having a plurality of pin holes therethrough, said pins being coupled to said secondary disc and extending through said pin holes.

2. A brake according to claim 1 wherein said first fluid input includes a first orifice in said housing in communication with the fluid source and said chamber.

3. A brake according to claim 2 further comprising an orifice adapter, said orifice adaptor being positioned within said first orifice and restricting flow therethrough.

4. A brake according to claim 3 further comprising a plug receivable within said orifice adapter, said plug having a bore, said bore permitting a predetermined amount of fluid to continually flow therethrough.

5. A brake according to claim 1 wherein said pin is drawn out of said orifice when said rotatable and said stationary discs are engaged.

6. A brake according to claim 1 wherein said housing includes at least one drain port in communication with said chamber and the negative pressure source, wherein the flow rate of fluid provided through said first input is less than the flow rate of fluid removed through said drain port.

7. A brake according to claim 1, wherein said fluid is oil.

8. A brake adapted to be rotationally coupled with a shaft and in communication with a fluid source and a negative pressure source, the brake comprising:

a housing defining a chamber;

a disc assembly positioned within said chamber including a plurality of stationary discs carried by said housing and a plurality of rotating discs carried by the shaft, said rotatable discs and said stationary discs being positioned for engagement with each other;

a piston movable to cause said stationary discs to engage said rotatable discs;

a first fluid input in communication with the fluid source and providing a constant supply of fluid to said chamber;

a second fluid input in communication with the fluid source and providing fluid when said stationary and said rotating discs are caused to engage;

at least one pin, said second fluid input including an orifice in said housing, said pin being operatively connected to at least one disc in said disc assembly and obstructing said second orifice when said rotatable and said stationary discs are not engaged; and a lip seal disposed in said orifice, said pin engaging said lip seal when said rotating and said stationary discs are not engaged.

9. A brake adapted to be rotationally coupled with a shaft, the brake comprising:

a housing having a chamber therein;

a disc assembly positioned within said chamber and including a plurality of stationary discs carried by said housing and a plurality of rotating discs carried by the shaft, said rotatable discs and said stationary discs being axially movable and positioned for engagement with each other;

a first orifice adapted to communicate a constant supply of fluid to said chamber;

a second orifice adapted to variably provide fluid to said chamber;

at least one pin, said pin being operatively connected to said disc assembly and selectively obstructing said second orifice;

wherein a braking force is applied to the shaft when a compressive force is applied to said disc assembly, said second orifice being unobstructed when said compressive force is applied and obstructed when no compressive force is applied, and wherein said disc assembly further includes a primary disc and a secondary disc, said secondary disc abutting said primary disc at the end of said disc assembly, said primary disc having a plurality of pin holes therethrough, said pins being coupled to said secondary disc and extending through said pin holes.

10. A brake according to claim 9 further comprising an orifice adapter, said orifice adaptor being positioned within said first orifice and regulating flow therethrough.

11. A brake according to claim 10 further comprising a plug receivable within said orifice adapter, said plug including a bore, said bore having a predetermined diameter which regulates the fluid flow rate therethrough.

12. A brake according to claim 9 further including a plurality of springs and a piston positioned to oppose the force of said springs, said springs being biased to provide the compressive force to said primary disc, and said piston being movable to oppose the bias springs to remove the compressive force from said disc assembly.

13. A brake according to claim 12 further comprising a second piston, said primary disc having a plurality of piston holes therethrough, said piston extending through said piston holes to contact said secondary disc and movable to cause said compressive force on said disc assembly.

14. A brake according to claim 9 further including a lip seal disposed in said second orifice, and a pin engaging said lip seal when said rotating and said stationary discs are not compressed.

15. A brake according to claim 9 wherein said housing includes at least one drain port, wherein the flow rate of fluid provided through said first orifice is less than the flow rate of fluid removed through said drain port.

16. A brake according to claim 9 wherein said fluid is oil.

* * * * *